Figure 1:
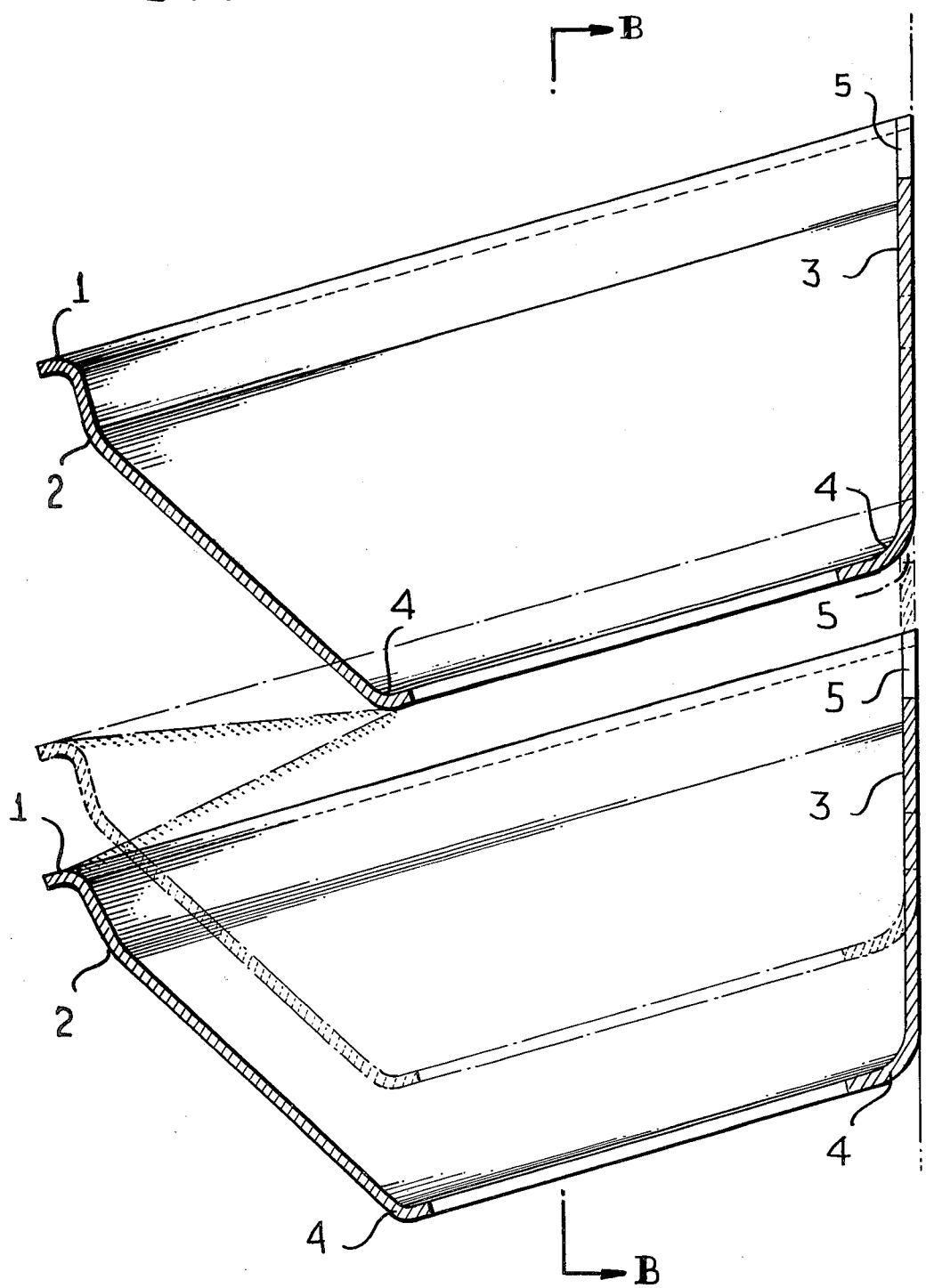

United States Patent [19]

Tripoteau

[11] 4,200,184
[45] Apr. 29, 1980

[54] BOTTOMLESS BUCKET FOR HOIST CONVEYORS

[76] Inventor: Jean Tripoteau, 40, rue du Drouillard, 44620 La Montagne, France

[21] Appl. No.: 904,279

[22] Filed: May 9, 1978

[51] Int. Cl.$^2$ .............................................. B65G 17/36
[52] U.S. Cl. .................................... 198/713; 198/701; 198/711
[58] Field of Search ............... 198/711, 713, 714, 701, 198/708, 688, 698, 699; 37/69, 83, 191 R, 192 R

[56] References Cited

U.S. PATENT DOCUMENTS

| 2,370,531 | 2/1945 | Gemeny | 198/711 |
| 3,687,272 | 8/1972 | Eisenegger | 198/716 |

FOREIGN PATENT DOCUMENTS

E 7246 9/1955 Fed. Rep. of Germany .......... 81 E/39

1521607 3/1968 France .

*Primary Examiner*—Bruce H. Stoner, Jr.
*Assistant Examiner*—Brian Bond
*Attorney, Agent, or Firm*—Diller, Ramik & Wight

[57] ABSTRACT

The buckets used for producing hoist conveyor devices according to the invention comprise at their upper and lower edges reinforcing means for the purpose of improving the rigidity of the wall of said buckets, which walls include laterally a greater convergence so as to prevent the largest passage for the lateral feeding between the walls of the upper bucket and the leading edge of the following bucket. For the purpose of modifying the positioning pitch according to the nature of the substance to be carried, the rear surface of the bucket becoming supported on the conveyor belt includes at its upper edge a bevel shoulder whose cutout is of a size to circumscribe the contour of the lower part of the bucket placed immediately above.

8 Claims, 2 Drawing Figures

U.S. Patent   Apr. 29, 1980   Sheet 1 of 2   4,200,184

BOTTOMLESS BUCKET FOR HOIST CONVEYORS

The present invention relates to buckets for hoist conveyors.

These devices enable the raising at a given linear speed of fractional loads determined by the unit content or useful load of the bucket and the number of these buckets per linear meter. In the case of dry granular substances a part of the load is pressed back by the reaction of the bottom of each bucket on sudden contact with the substance to be taken up. Where moist substances are concerned clogging of the bucket caused by the sharp angles of the bottom is rapidly observed further reducing their useful capacity. Currently used buckets for the transportation of flours or powdery substances generally are equipped with bottoms of rounded shapes for the purpose of avoiding clogging. However, this arrangement must be associated with a reduced linear speed in order to permit the removal of air accumulated at the moment of the entry of the bucket into the mass of the substance in the loading phase. The production of maximum delivery rate at reduced linear speed can only be effected by over-sized buckets. In order to overcome these drawbacks, polyvalent buckets have been produced corresponding to all requirements. According to the invention described in French Pat. No. 1.521.607 filed 3 March in the name of Applicant, it is an object of this invention to provide a hoist conveyor device equipped with bottomless buckets produced by forming of sheet steel or of plastics material in a section of a pyramid with offset top, the sharp edges being eliminated and replaced by rounded edges and beads.

The device, according to the invention, enables the polyvalence of the bottomless buckets to be improved and universal vertical transportion to be achieved with granular materials of large caliber such as corn, soya beans, gravels, of average and small caliber such as cereals, chippings, sand, etc, . . . as well as farinaceous products such as wheat flours, cattle feed, oil cakes, slightly flowing or fluidizing powder products such as powdered milk, granulated sugar, very fine flours, plaster or the like as well as very flowable or very fluidizing materials such as fine plaster, cement, phosphates and derivatives.

The buckets used for producing hoist conveyor devices according to the invention comprise at their upper and lower edges reinforcing means for the purpose of improving the rigidity of the wall of said buckets, which walls include laterally a greater convergence so as to prevent the largest passage for the lateral feeding between the walls of the upper bucket and the leading edge of the following bucket. For the purpose of modifying the positioning pitch according to the nature of the substance to be carried, the rear surface of the bucket becoming supported on the conveyor belt includes at its upper edge a bevel shoulder whose cutout is of a size to circumscribe the contour of the lower part of the bucket placed immediately above.

Figure 2:
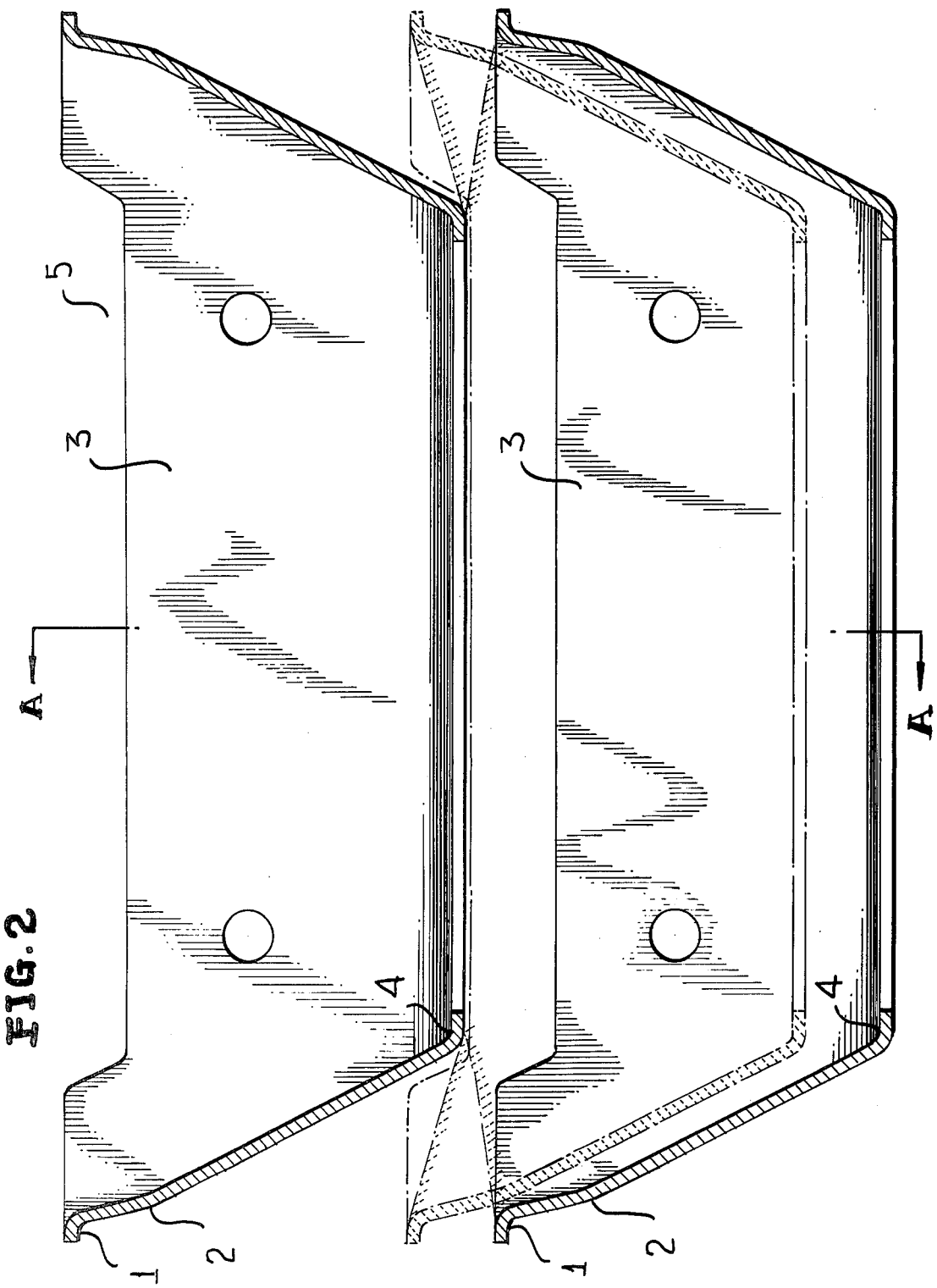

The accompanying drawings illustrate by way of example an embodiment of a bucket according to the present invention. In the latter:

FIG. 1 shows two consecutive buckets in longitudinal section along AA with, shown in dotted elements, a possible relative position of said buckets in closer pitch position, FIG. 2 shows the same buckets in cross section along the line BB.

As shown, the bucket includes at its upper part a leading edge 1 or flanged edge with an outer edge ensuring rigidity of the bucket and bracing of the upper frame. This arrangement only involves the front and side surfaces of the bucket; in the same way these three surfaces are folded at a certain distance from the upper edge in order to form a band of rigidity 2. The rear surface 3 is flat so as to come into application against the conveyor belt on which each bucket is fixed. The lower edges of the four walls of the bucket include an edge flanged towards the inside 4 thus forming a reinforcement of the base of the bucket. The upper portion of the side walls, comprised between the leading edge 1 and the fold 2 is slightly inclined so as to permit good penetration of the bucket into the material; on the other hand, the part comprised between the fold 2 and the flanged edge 4 of the bottom is more converging so as to present the largest possible passage to the lateral supply between the side walls of the bucket and the leading edge of the following bucket.

The material to be carried is kept in a column inside the walls of the buckets to the extent that the bank formed between each bucket in the zone situated between the leading edges of the lower bucket and the trailing edges of the upper bucket, corresponds to the natural bank of slippage of the material. The angle of this bank varies according to the nature of the materials, their degree of humidity, their temperature and their tendency to fluidize. The position pitch according to the material is hence the sum of the total height of the bucket and the height determined by the intermediate bank or space between buckets; thus the laying pitch is all the greater as the natural slippage bank is greater and conversely. A laying pitch whose value is less than the height of the bucket nessitates a straggling assembly: this is the case for fluidizing and very fluidizing materials. To this end, the rear surface of the bucket includes a cut-out or bevel shoulder 5, whose height corresponds to the straddling height with the lower part of the upper bucket. The position pitch is thus adaptable according as granular, powdery or pulverulent materials have to be transported; the method of mounting can be defined by a given number of buckets to the linear meter. In the case of transportation of mixed or alternated materials with the same hoist conveyor device, the selected position pitch will be that corresponding to the most disadvantageous material. FIGS. 1 and 2 illustrate in dotted elements a position pitch with straddling of the buckets.

The invention applies to all hoist conveyor devices constituted by belts or chains equipped with buckets.

What we claim is:

1. A bottomless bucket adapted for use with vertical conveyors for transporting granular, farinaceous, pulverulent, fluidized and like materials comprising a generally truncated pyramid body defined by a front wall, a rear wall and a pair of opposite spaced side walls, the walls of said body having upper and lower terminal edge portions, a major portion of said front and side walls each being of a first predetermined angle to a plane taken through said upper terminal edge portions, upper wall portions of said front and side walls between the terminal edge portions thereof and said major portion being each of a second predetermined angle to a plane taken through said upper terminal edge portions which is greater than said first predetermined angle, and a portion of said rear wall upper terminal edge portion being below said front and side wall upper terminal edge portions thereby forming a cut-out enabling the positioning pitch of the bucket to be varied according to the natural slippage bank of the material to be transported.

2. The bucket as defined in claim 1 wherein said front and side wall upper terminal edge portions define an outwardly directed reinforcing flange.

3. The bucket as defined in claim 2 wherein said front, side and rear wall lower terminal edge portions define an inwardly directed reinforcing flange.

4. The bucket as defined in claim 3 wherein said cut-out is of a height and width corresponding to the contour of the straddling zone of said bucket with another bucket immediately thereabove when the natural slippage bank involves a positioning pitch less than the height of a bucket.

5. The bucket as defined in claim 2 wherein said cut-out is of a height and width corresponding to the contour of the straddling zone of said bucket with another bucket immediately thereabove when the natural slippage bank involves a positioning pitch less than the height of a bucket.

6. The bucket as defined in claim 1 wherein said front, side and rear wall lower terminal edge portions define an inwardly directed reinforcing flange.

7. The bucket as defined in claim 6 wherein said cut-out is of a height and width corresponding to the contour of the straddling zone of said bucket with another bucket immediately thereabove when the natural slippage bank involves a positioning pitch less than the height of a bucket.

8. The bucket as defined in claim 1 wherein said cut-out is of a height and width corresponding to the contour of the straddling zone of said bucket with another bucket immediately thereabove when the natural slippage bank involves a positioning pitch less than the height of a bucket.

* * * * *